(12) United States Patent
Park

(10) Patent No.: US 10,520,607 B2
(45) Date of Patent: Dec. 31, 2019

(54) BEAM TRACKING METHOD AT THE TIME OF TERMINAL BLOCKING AND TERMINAL INCLUDING THE SAME

(71) Applicant: ELECTRONICS AND TELECOMMUNICATIONS RESEARCH INSTITUTE, Daejeon (KR)

(72) Inventor: Jung-Woo Park, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 509 days.

(21) Appl. No.: 15/381,426

(22) Filed: Dec. 16, 2016

(65) Prior Publication Data

US 2017/0212244 A1 Jul. 27, 2017

(30) Foreign Application Priority Data

Dec. 18, 2015 (KR) .................. 10-2015-0182251
Dec. 16, 2016 (KR) .................. 10-2016-0172613

(51) Int. Cl.

| | | |
|---|---|---|
| *G01S 19/26* | (2010.01) | |
| *H04B 7/06* | (2006.01) | |
| *H01Q 1/12* | (2006.01) | |
| *H01Q 3/26* | (2006.01) | |
| *H04B 7/0417* | (2017.01) | |
| *H04B 7/08* | (2006.01) | |

(52) U.S. Cl.
CPC .......... *G01S 19/26* (2013.01); *H01Q 1/1257* (2013.01); *H01Q 3/2605* (2013.01); *H04B 7/0417* (2013.01); *H04B 7/0617* (2013.01); *H04B 7/0619* (2013.01); *H04B 7/0623* (2013.01); *H04B 7/0626* (2013.01); *H04B 7/0695* (2013.01); *H04B 7/086* (2013.01); *H04B 7/088* (2013.01)

(58) Field of Classification Search
CPC .............................. G01S 19/26; H01Q 3/2676
USPC .......................................................... 342/91
See application file for complete search history.

(56) References Cited

U.S. PATENT DOCUMENTS

| | | |
|---|---|---|
| 6,191,734 B1 | 2/2001 | Park et al. |
| 7,460,834 B2 | 12/2008 | Johnson et al. |
| 8,462,753 B2 | 6/2013 | Eom et al. |

(Continued)

FOREIGN PATENT DOCUMENTS

| | | | | |
|---|---|---|---|---|
| DE | 102010043122 A | * | 5/2012 | ........... H04B 7/0617 |
| EP | 0432647 A2 | | 6/1991 | |

(Continued)

OTHER PUBLICATIONS

U.S. Appl. No. 15/232,217, filed Dec. 2016, Zhang.*
U.S. Appl. No. 14/522,173, filed Apr. 2016, Stephenne.*

*Primary Examiner* — Mamadou L Diallo
(74) *Attorney, Agent, or Firm* — LRK Patent Law Firm

(57) ABSTRACT

A beam tracking method and a terminal including the same. The terminal may measure power of a signal received from a base station and determine whether there is a behavior change of the terminal. Further, the terminal may determine whether the signal is blocked using the measured power and the behavior change of the terminal and perform the beam tracking through a secondary beam if it is determined that the signal is blocked.

15 Claims, 4 Drawing Sheets

(56) References Cited

U.S. PATENT DOCUMENTS

| | | | |
|---|---|---|---|
| 9,215,527 B1* | 12/2015 | Saric | H04R 3/005 |
| 2009/0111381 A1 | 4/2009 | Johnson et al. | |
| 2015/0171968 A1* | 6/2015 | Featherston | H04B 10/1123 |
| | | | 398/118 |
| 2016/0353510 A1* | 12/2016 | Zhang | H04L 43/16 |

FOREIGN PATENT DOCUMENTS

| | | | | |
|---|---|---|---|---|
| KR | 10-2006-0119986 A | | 11/2006 | |
| KR | 2014-0001271 A | * | 7/2015 | Y02D 70/10 |
| KR | 2015-0149584 A | * | 7/2016 | H04B 7/08 |
| WO | PCT/EP2001/007295 | * | 1/2002 | H01Q 3/24 |

* cited by examiner

FIG. 2

|  |  | Rotation of terminal | Displacement of terminal | Blocking of signal |
|---|---|---|---|---|
| Whether beam tracking is required | AoD | X | O | X |
|  | AoA | O | O | X |
|  | RX beam tracking | O | O | X |
|  | TX beam tracking | X | O | X |
|  | Secondary Beam | X | X | O |

BEAM TRACKING METHOD AT THE TIME OF TERMINAL BLOCKING AND TERMINAL INCLUDING THE SAME

CROSS-REFERENCE TO RELATED APPLICATION(S)

This application claims priority to and the benefit of Korean Patent Application Nos. 10-2015-0182251 and 10-2016-0172613, filed in the Korean Intellectual Property Office on Dec. 18, 2015 and Dec. 16, 2016, respectively, the entire contents of which are incorporated herein by reference.

BACKGROUND OF THE INVENTION

1. Field of the Invention

The present invention relates to a beam tracking method at the time of terminal blocking in a millimeter wave communication system and a terminal including the same.

2. Description of Related Art

In the 5G mobile communication system, since a transmission speed of 1,000 times or more is required compared to the present LTE, studies on a communication system using a millimeter wave (mmWave) band have been actively conducted. The millimeter wave band has a wide frequency band, strong signal straightness, and forms sharp beams with small antenna arrays, thereby providing high transmission capacity.

The millimeter wave communication system considers an analog beamforming scheme with a single chain rather than a digital beamforming scheme, due to an analog to digital (A/D) converter requiring high sampling frequency and the price burden of an RF chain. That is, the millimeter wave communication system uses codebook based switched beamforming as the analog beamforming scheme. In the switched beamforming, a large gain may be obtained when a beam of a transmitting side and a beam of the receiving side, that is, a pair of beams maximizing an SNR are aligned. Therefore, the millimeter wave communication requires beam training, i.e., a process of finding a pair of optimal transmitting and receiving beams In general, the beam training takes time proportional to the product of the number of the transmitting and receiving antenna beams, and therefore takes a lot of time.

On the other hand, in the millimeter wave communication system, since a beam width is very narrow, a mismatch between the beams may be caused even in a small behavior change of the terminal. The mismatch between the beams causes a sharp attenuation of the received signal. The reception environment change of the terminal may be caused by the beam signal attenuation caused by the reception environment change such as a signal obstruction caused by an external moving object, and a body contact of an antenna, or the mismatch between the beams caused by the behavior changes of the terminal such as a rotation of the terminal and a displacement of the terminal. In this case, in order to find a best beam, the entire process of the beam training is performed again, which leads to a long time consuming problem.

SUMMARY OF THE INVENTION

The present invention has been made in an effort to provide an efficient beam tracking method at the time of terminal blocking and a terminal including the same.

An exemplary embodiment of the present invention provides a method for performing, by a terminal, beam tracking. The beam tracking method may include: measuring power of a signal received from a base station; determining whether there is a behavior change of the terminal; determining whether the signal is blocked using the power and the behavior change of the terminal; and performing beam tracking through a secondary beam if it is determined that the signal is blocked in the determining whether the signal is blocked.

The determining whether the signal is blocked may include: comparing the power with a threshold value; and determining that the signal is blocked if the power is smaller than the threshold value and there is no behavior change of the terminal.

The beam tracking method may further include: requesting the base station to transmit the beam by widening a transmitter (TX) beam width if there is no secondary beam.

The beam tracking method may further include: stopping the beam tracking if the power of the signal received through the widened transmitter (TX) beam width is smaller than the threshold value.

The beam tracking method may further include: stopping the beam tracking if the received power of the signal through the secondary beam is smaller than the threshold value.

The behavior change of the terminal may include a rotation of the terminal and a displacement of the terminal.

The method may further include: performing only receiver (RX) beam tracking of the terminal if it is determined that there is the rotation of the terminal as the behavior change of the terminal.

Another embodiment of the present invention provides a terminal performing communication with a base station. The terminal may include: a received power measurement unit measuring power of a signal received from the base station; a motion sensor unit sensing a behavior change of the terminal; a situation determination unit determining whether the signal is blocked using the power and the behavior change of the terminal; and a beam tracking control unit performing beam tracking through a secondary beam if the situation determination unit determines that the signal is blocked.

The situation determination unit may determine that the signal is blocked if the power is smaller than a threshold value and there is no behavior change of the terminal.

The beam tracking control unit may request the base station to transmit a beam by widening a transmitter (TX) beam width if there is no secondary beam.

The beam tracking control unit may stop the beam tracking if the received power of the signal through the secondary beam is smaller than the threshold value.

The behavior change of the terminal may include a rotation of the terminal and a displacement of the terminal.

Yet another exemplary embodiment of the present invention provides a method for performing, by a terminal, beam tracking. The beam tracking method may include: performing initial beam tracking at the time of a connection to a base station; measuring power of a signal received from the base station; comparing the power with a threshold value; determining whether there is a behavior change of the terminal; and performing the beam tracking through a secondary beam if the power is smaller than the threshold value, there is no behavior change of the terminal, and there is the secondary beam at the time of the initial beam tracking.

The terminal may determine that the beam transmitted from the base station is blocked if the power is smaller than the threshold value and there is no behavior change of the terminal.

The behavior change of the terminal may include a rotation of the terminal and a displacement of the terminal.

According to an exemplary embodiment of the present invention, it is possible to perform the efficient beam tracking by performing different beam tracking according to the situations of the terminal.

According to another embodiment of the present invention, it is possible to quickly perform the alternative beam tracking without performing the unnecessary beam tracking at the time of the signal blocking of the terminal.

According to still another exemplary embodiment of the present invention, it is possible to reduce the overhead of the beam tracking by accurately recognizing the behavior change and the reception environment change of the terminal.

BRIEF DESCRIPTION OF THE DRAWINGS

FIG. 2 is a diagram illustrating whether the beam tracking is required depending on a behavior change and a reception environment change of a terminal, according to an exemplary embodiment of the present invention.

DETAILED DESCRIPTION OF THE EMBODIMENTS

Figure 1:
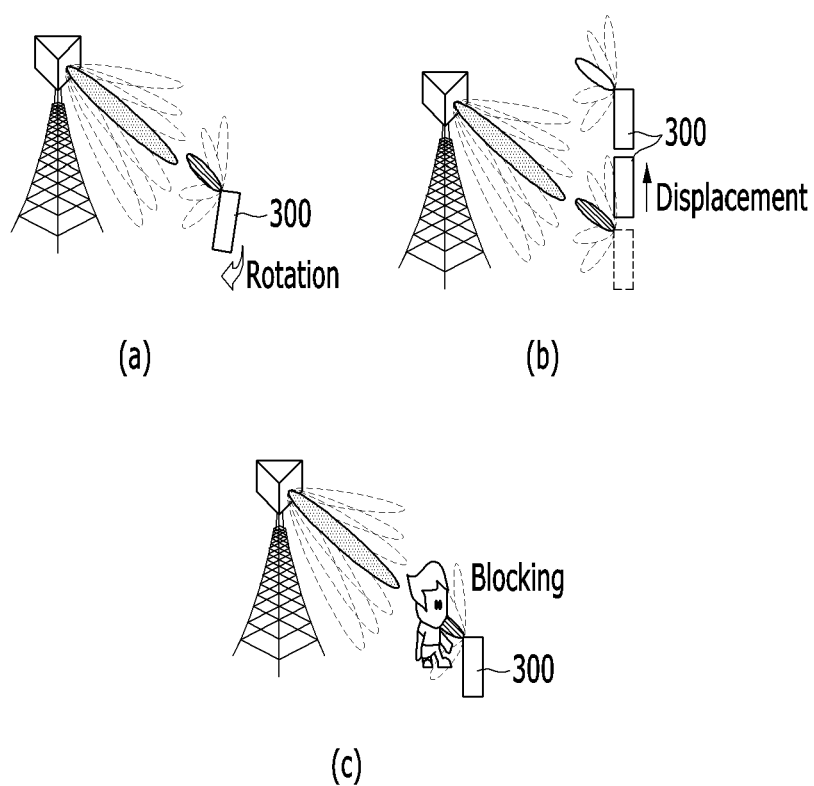
FIG. 1 is diagram illustrating a situation in which beam tracking is required, according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a terminal may be called a mobile terminal (MT), a mobile station (MS), an advanced mobile station (AMS), a high reliability mobile station (HR-MS), a subscriber station (SS), a portable subscriber station (PSS), an access terminal (AT), user equipment (UE), and the like and may include functions of all or some of the MT, the AMS, the HR-MS, the SS, the PSS, the AT, the UE, and the like Further, a base station (BS) may be called an advanced base station (ABS), a high reliability base station (HR-BS), a nodeB, an evolved node B (eNodeB), an access point (AP), a radio access station (RAS), a base transceiver station (BTS), a mobile multihop relay (MMR)-BS, a relay station (RS) serving as a base station, a high reliability relay station (HR-RS) serving as a base station, and the like and may also include functions of all or some of the ABS, the nodeB, the eNodeB, the AP, the RAS, the BTS, the MMR-BS, the RS, the HR-RS, and the like.

A beam tracking method according to an exemplary embodiment of the present invention recognizes a situation change depending on a behavior change or a reception environment change of a terminal and understands a cause of the situation change to perform minimum beam tracking.

FIG. 1 is a diagram illustrating a situation in which beam tracking is required, according to an exemplary embodiment of the present invention.

In FIG. 1, (a) illustrates a case in which a terminal 300 rotates and (b) illustrates a case in which the terminal 300 is displaced. Further, in FIG. 1, (c) illustrates a case in which a signal is blocked by an external moving object (which illustrates the blocking by a person). When the terminal 300 rotates or is displaced as described above, a beam is inaccurate and therefore beam tracking is required. Also, even if the terminal 300 experiences a signal blocking by an external moving object, beam signal attenuation occurs and thus the beam tracking is required.

FIG. 2 is a diagram illustrating whether the beam tracking is required depending on a behavior change and a reception environment change of a terminal, according to an exemplary embodiment of the present invention.

As illustrated in FIG. 2, when the terminal 300 rotates, an angle of arrival (AOA) is changed depending on the degree of rotation and when the terminal 300 is displaced, both of angle of departure (AoD) and the AoA are changed. Further, if the signal is blocked by an external object or body contact, the AoA and the AoD are not changed but an attenuation of a received signal occurs.

The beam tracking method according to the exemplary embodiment of the present invention determines the above situations and then applies different beam tracking method depending on the situation. As illustrated in FIG. 2, when the terminal 300 rotates, only beam tracking of a receiver (RX, i.e., terminal) is required. When the terminal 300 is displaced, beam tracking of a transmitter (TX) (i.e., base station) as well as beam tracking of the receiver (RX) is required. Further, when the signal is blocked, no mismatch between a beam of the current transmitter and a beam of the receiver occurs, and therefore the beam tracking for the current beam is not required. In this case, it is necessary to perform communication through a secondary beam. Here, a secondary beam pair is mostly known through an initial beam tracking process in advance.

Figure 3:
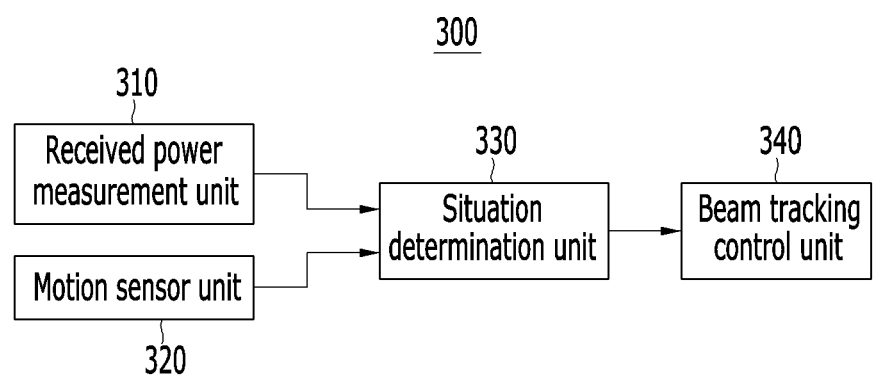
FIG. 3 is a diagram illustrating a terminal according to an exemplary embodiment of the present invention.

FIG. 3 is a diagram illustrating the terminal 300 according to an exemplary embodiment of the present invention.

As illustrated in FIG. 3, the terminal 300 according to the embodiment of the present invention includes a received power measurement unit 310, a motion sensor unit 320, a situation determination unit 330, and a beam tracking control unit 340.

The received power measurement unit 310 senses a signal received from the base station and measures the power of the sensed received signal. A method of measuring, by a received power measurement unit 310, the received power will be apparent to a person having ordinary skill in the art to which the present invention pertains, and a detailed description thereof will be omitted.

The motion sensor unit 320 senses the rotation of the terminal and the displacement of the terminal. That is, the motion sensor unit 320 senses a behavior change (rotation of the terminal and displacement of the terminal) of the terminal using a predetermined sensor. The motion sensor unit 320 is implemented by an attitude and heading reference system (AHRS) and a zero velocity detector (ZVD) and may sense the rotation of the terminal through the AHRS and sense the displacement of the terminal through the ZVD.

The situation determination unit 330 determines the situation of the terminal using the received power measured by the received power measurement unit 310 and the behavior change of the terminal sensed by the motion sensor unit 320.

The situation determination unit 330 determines whether the received power measured by the received power measurement unit 310 is smaller than a threshold value. When the received power is smaller than the threshold value, the situation determination unit 330 determines the behavior change (i.e., rotation of the terminal or displacement of the terminal) of the terminal sensed by the motion sensor unit 320. If it is determined that the received power is smaller than the threshold value and there is no behavior change of the terminal, it is determined that the signal received from the base station is blocked (obstruction of the signal).

The beam tracking control unit 340 performs appropriate beam tracking in response to the situation of the terminal determined by the situation determination unit 330.

The beam tracking control unit 340 performs only the beam tracking of the receiver RX (i.e., the terminal) when determining the rotation of the terminal and performs the beam tracking on the transmitter (TX) beam as well as the receiver (RX) beam when determining the displacement of the terminal.

When determining that the signal is blocked, the beam tracking control unit 340 performs the beam tracking through the secondary beam. Here, the beam tracking control unit 340 performs the tracking through the secondary beam when there is the detected secondary beam at the time of performing initial beam tracking and the received power by a secondary beam path is higher than the threshold value. Further, when the received power by the secondary beam path is smaller than the threshold value, the beam tracking control unit 340 stops the beam tracking. When there is no detected secondary beam at the time of performing the initial beam tracking, the beam tracking control unit 340 requests the base station to transmit a beam by widening a beam width of a transmitting antenna. The widened beam width in this way can reduce a shadowing effect. If the power received through the widened beam width is smaller than the threshold value, the beam tracking control unit 340 stops the beam tracking.

Figure 4:
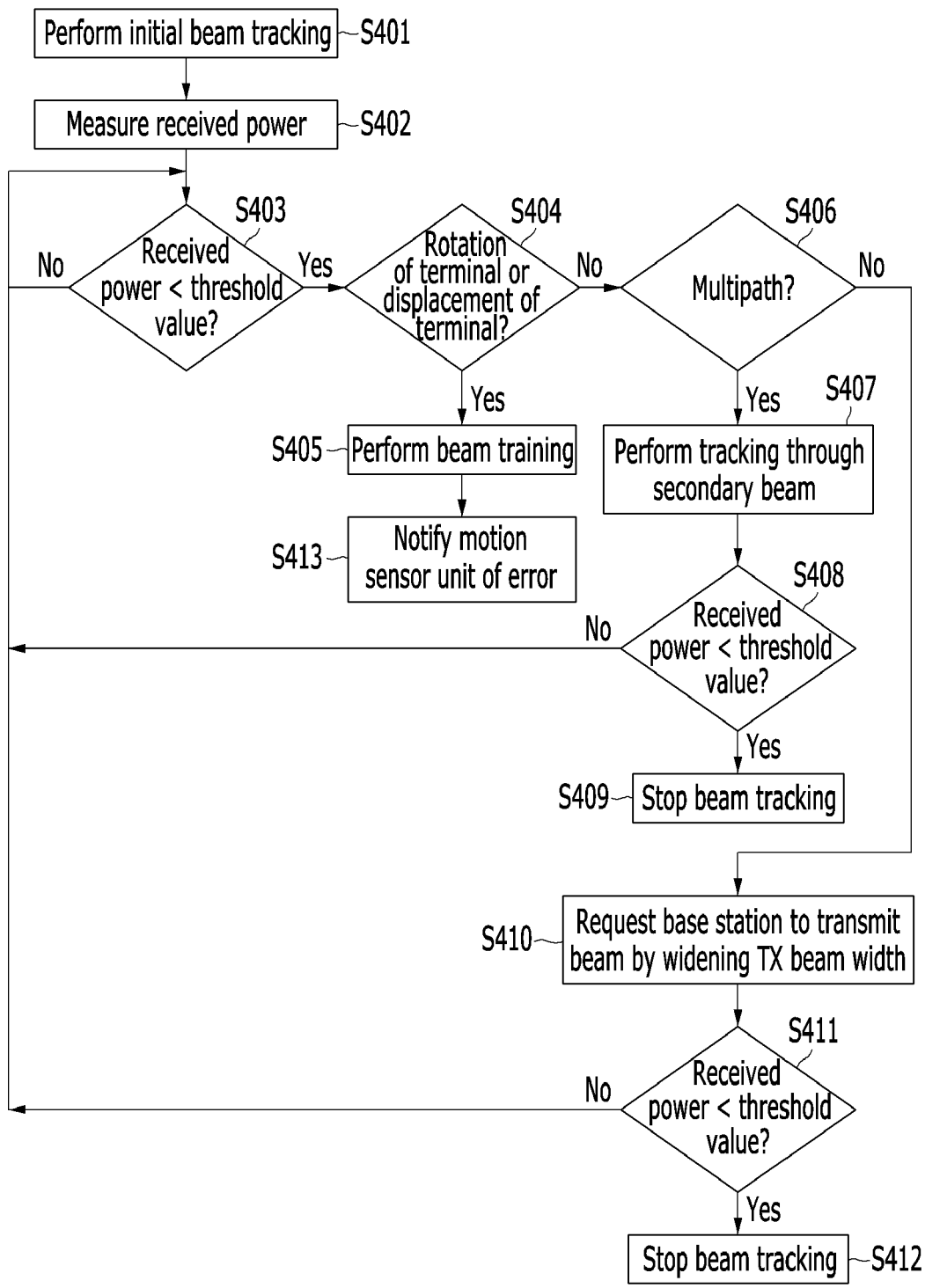
FIG. 4 is a flow chart of a beam tracking method of a terminal according to the exemplary embodiment of the present invention.

FIG. 4 is a flow chart of a beam tracking method of a terminal according to the exemplary embodiment of the present invention.

First, the terminal 300 performs initial beam tracking (S401). That is, the terminal 300 tracks what the best beam is at the time of an initial connection to the base station. At this time, the selected beam is a primary beam. Further, at the time of the initial beam tracking, the second most suitable beam after the primary beam is a secondary beam.

The terminal 300 measures the received power using a signal received from the base station (S402). As described with reference to FIG. 3, the measurement of the received power is performed by the received power measurement unit 310 of the terminal 300.

The terminal 300 compares the received power measured in step S402 with the threshold value (S403). The comparison of the received power with the threshold value is performed by the situation determination unit 330 of the terminal 300. When the received power is smaller than the threshold value, the following step S404 is performed.

When determining in step S403 that the received power is smaller than the threshold value, the terminal 300 determines whether there is the behavior change (i.e., rotation of the terminal or displacement of the terminal) of the terminal (S404). The determination on the behavior change of the terminal is performed by the situation determination unit 330 of the terminal 300 as described with reference to FIG. 3.

The case in which it is determined in step S404 that there is the behavior change (rotation of the terminal or displacement of the terminal) of the terminal corresponds to a case in which a signal is not received well by performing tracking through another beam due to an accuracy error of the motion sensor unit 320. Accordingly, the terminal 300 notifies the motion sensor unit of an error occurrence after performing the beam training with the electric signal (S405, S413).

If there is no behavior change of the terminal in step S404, the terminal 300 determines that the signal is blocked to determine whether there is a multipath (step S406). The presence or absence of the multipath indicates whether there is the secondary beam at the time of the initial beam tracking in S401.

When determining that there is the multipath in step S406 the terminal 300 performs the tracking through the secondary beam (S407). That is, if there is the detected secondary beam at the time of performing initial beans tracking and the received power by the secondary beam path is higher than the threshold, the terminal 300 tracks the secondary beam and returns to an initial step (S408, S403).

Further, if the received power by the secondary beam path is smaller than the threshold value, the terminal 300 stops the beam tracking (S408, S409).

Meanwhile, if there is no multipath in step S406, the terminal 300 requests the base station to transmit a beam by widening a TX beam width (S410). The base station receiving the request widens a beam width of the transmitting antenna to transmit a signal. By widening the beam width as described above and transmitting the beam, the shadowing effect can be reduced.

The terminal 300 measures the received power of the signal transmitted by widening the beam width in step S410 and if the received power is greater than the threshold value, the terminal 300 returns to step S403 (S411, S403).

If the received power of the signal transmitted by widening the beam width in step S410 is smaller than the threshold value, the terminal 300 stops the beam tracking (S411, S412).

As described above, according to an embodiment of the present invention, it is possible to quickly perform the appropriate beam tracking without performing the unnecessary beam tracking at the time of the signal blocking of the terminal. Further, according to an exemplary embodiment of the present invention, it is possible to reduce the overhead of the beam tracking by accurately recognizing the behavior change and the reception environment change of the terminal.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for performing, by a terminal, beam tracking, comprising:
   measuring power of a signal received from a base station;
   determining whether there is a behavior change of the terminal;
   determining whether the signal is blocked using the power and the behavior change of the terminal; and performing beam tracking through a secondary beam if it is determined that the signal is blocked in the determining whether the signal is blocked.

2. The method of claim 1, wherein:
the determining whether the signal is blocked includes:
comparing the power with a threshold value; and
determining that the signal is blocked if the power is smaller than the threshold value and there is no behavior change of the terminal.

3. The method of claim 2, further comprising:
requesting the base station to transmit the beam by widening a transmitter (TX) beam width if there is no secondary beam.

4. The method of claim 3, further comprising:
stopping the beam tracking if the power of the signal received through the widened transmitter (TX) beam width is smaller than the threshold value.

5. The method of claim 2, further comprising:
stopping the beam tracking if the received power of the signal through the secondary beam is smaller than the threshold value.

6. The method of claim 1, wherein:
the behavior change of the terminal includes a rotation of the terminal and a displacement of the terminal.

7. The method of claim 6, further comprising:
performing only receiver (RX) beam tracking of the terminal if it is determined that there is the rotation of the terminal as the behavior change of the terminal.

8. A terminal performing communication with a base station, comprising:
a received power measurement unit measuring power of a signal received from the base station;
a motion sensor unit sensing a behavior change of the terminal;
a situation determination unit determining whether the signal is blocked using the power and the behavior change of the terminal; and
a beam tracking control unit performing beam tracking through a secondary beam if the situation determination unit determines that the signal is blocked.

9. The terminal of claim 8, wherein:
the situation determination unit determines that the signal is blocked if the power is smaller than a threshold value and there is no behavior change of the terminal.

10. The terminal of claim 9, wherein:
the beam tracking control unit requests the base station to transmit a beam by widening a transmitter (TX) beam width if there is no secondary beam.

11. The terminal of claim 9, wherein:
the beam tracking control unit stops the beam tracking if the received power of the signal through the secondary beam is smaller than the threshold value.

12. The terminal of claim 8, wherein:
the behavior change of the terminal includes a rotation of the terminal and a displacement of the terminal.

13. A method for performing, by a terminal, beam tracking, comprising:
performing initial beam tracking at the time of a connection to a base station;
measuring power of a signal received from the base station;
comparing the power with a threshold value;
determining whether there is a behavior change of the terminal; and
performing the beam tracking through a secondary beam if the power is smaller than the threshold value, there is no behavior change of the terminal, and there is the secondary beam at the time of the initial beam tracking.

14. The method of claim 13, wherein:
the terminal determines that the beam transmitted from the base station is blocked if the power is smaller than the threshold value and there is no behavior change of the terminal.

15. The method of claim 13, wherein:
the behavior change of the terminal includes a rotation of the terminal and a displacement of the terminal.

* * * * *